UNITED STATES PATENT OFFICE.

PAUL THOMASCHEWSKI, OF VOHWINKEL, NEAR ELBERFELD, GERMANY, ASSIGNOR TO FARBENFABRIKEN VORM. FRIEDR. BAYER & CO., OF ELBERFELD, GERMANY, A CORPORATION OF GERMANY.

VAT DYE.

961,388.

Specification of Letters Patent. Patented June 14, 1910.

No Drawing.

Application filed February 19, 1910. Serial No. 544,868.

*To all whom it may concern:*

Be it known that I, PAUL THOMASCHEWSKI, doctor of philosophy, chemist, citizen of the German Empire, residing at Vohwinkel, near Elberfeld, Germany, have invented new and useful Improvements in Vat Dyes, of which the following is a specification.

My invention relates to the manufacture and production of new vat dyes of the anthracene series. The process for their production consists in treating anthraquinone mercaptans or the disulfids (obtained from mercaptans by oxidation) with sulfur.

The new dyes are after being dried and pulverized from brown to black powders which are insoluble in water, alkalies, alkaline sulfids and organic solvents. They yield on treatment with hydrosulfite and caustic alkali vats suitable for dyeing cotton from olive to gray to brownish-black fast shades.

In order to illustrate the new process more fully the following example is given, the parts being by weight:—1 part of anthraquinone-1.5-dimercaptan is introduced into 8 parts of molten sulfur. The mixture is then slowly heated to 300° C. until the disengagement of $SH_2$ ceases. After cooling the product of the reaction is powdered, extracted with a sodium sulfid solution to remove free sulfur, filtered off and washed. The new dye is a dark powder soluble in fuming sulfuric acid (20 per cent. $SO_3$) with a dull red color. The vat with hydrosulfite and NaOH has a violet-brown color. It dyes cotton fast olive shades.

The dyes obtained from anthraquinone-1- or 2-mercaptan and sulfur dye olive-gray. The dyes obtained from 2-methylanthraquinone-1-mercaptan, 4- or 5-aminoanthraquinone-1-mercaptan dye grayish-brown to black-brown.

I claim:—

1. The herein described new dyes obtainable from anthraquinone mercaptans, which dyes are after being dried and pulverized from brown to black powders, which are insoluble in water, alkalies, alkaline sulfids and organic solvents, giving vats with hydrosulfite and caustic soda lye, which vats dye cotton from olive to gray to brownish-black fast shades, substantially as described.

2. The herein described new dye obtainable from anthraquinone-1.5-dimercaptan and sulfur, which is after being dried and pulverized a dark powder soluble in fuming sulfuric acid containing 20 per cent. $SO_3$ with a dull red color, forming a violet-brown vat with hydrosulfite and NaOH which vat dyes cotton fast olive shades, substantially as described.

In testimony whereof I have hereunto set my hand in the presence of two subscribing witnesses.

PAUL THOMASCHEWSKI. [L. S.]

Witnesses:
 OTTO KÖNIG,
 CHAS. J. WRIGHT.